G. H. DELVIN.
MUSSEL DREDGE.
APPLICATION FILED APR. 28, 1917.
1,250,288.
Patented Dec. 18, 1917.
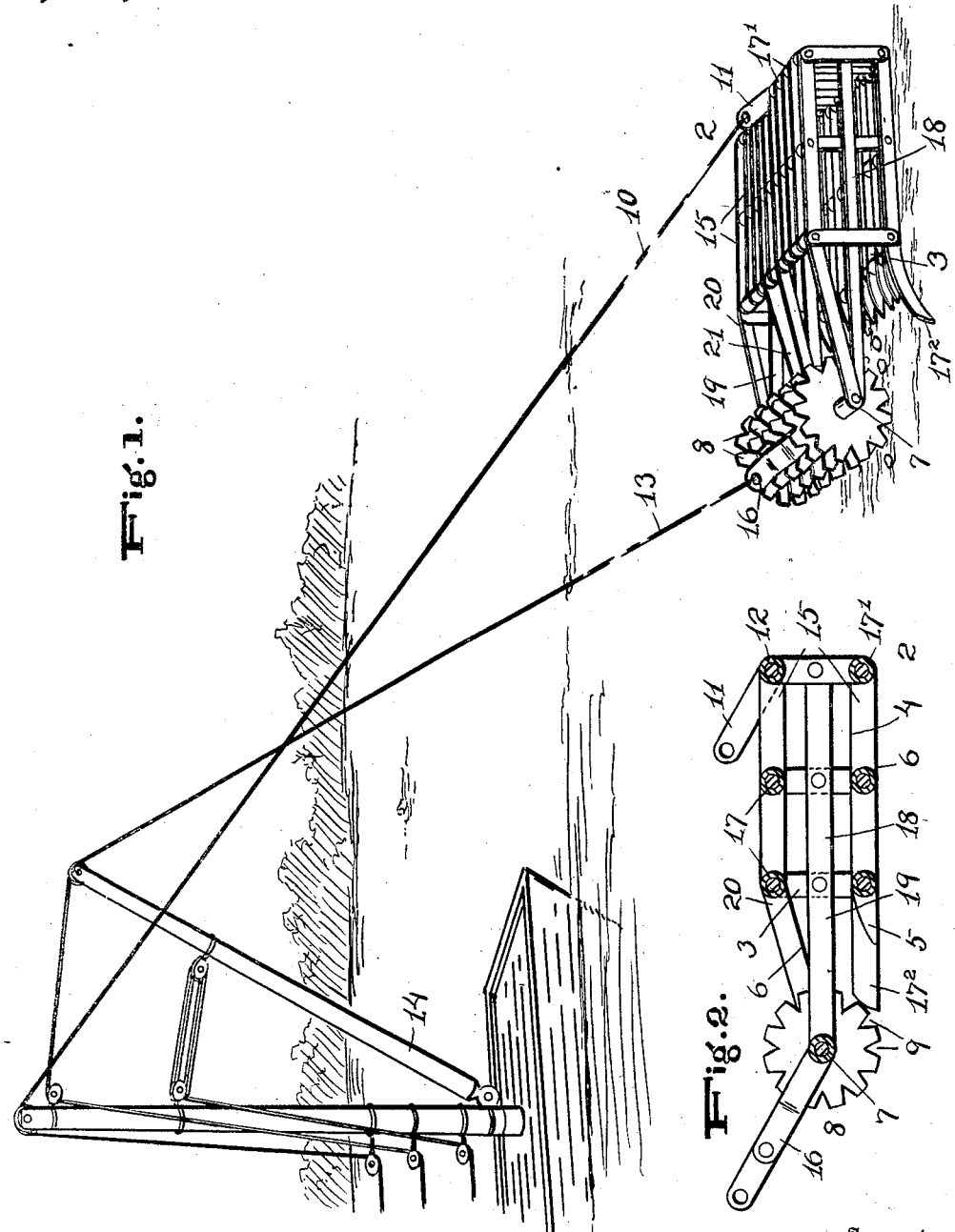

UNITED STATES PATENT OFFICE.

GEORGE H. DELVIN, OF HENDERSON, KENTUCKY.

MUSSEL-DREDGE.

1,250,288.  Specification of Letters Patent.  Patented Dec. 18, 1917.

Application filed April 28, 1917. Serial No. 165,204.

*To all whom it may concern:*

Be it known that I, GEORGE H. DELVIN, a citizen of the United States, resident of Henderson, in the county of Henderson and State of Kentucky, have made a certain new and useful Invention in Mussel-Dredges; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention, as applied.

Fig. 2 is a central longitudinal section of the dredge.

The invention has relation to dredges, designed particularly for use in fishing or dredging for mussels, and it consists in the novel construction and combinations of parts, as hereinafter set forth.

In the accompanying drawings, illustrating the invention, the numeral 2 designates a receptacle or box, open at the front at 3 and closed at the bottom, top, sides and rear, the floor 4 being usually beveled downwardly at the forward edge thereof at 5, the lower surface 6 of said floor being horizontal or without downward projections, so that the receptacle may be easily dragged upon the bed of a river or body of water.

The receptacle is of sufficient weight to sink to some extent in the comparatively soft river bed, so that, as it is dragged upon said bed, the mussels will be caused to pass into the open front of the receptacle, where they will remain.

Forward of the receptacle, and spaced apart therefrom at 6, is a transverse shaft 7, upon which are located a plurality of vertical disks or wheels 8, said wheels in the forward movement of the dredge being designed to engage and roll over snags, roots, stones or other obstructions, to thereby raise the forward portion of the receptacle and carry the same also over the obstruction. These disks or wheels are preferably independently rotatable or loose upon their shaft and peripherally notched at 9, to facilitate their action. They are located with their lower edges in the same plane or a little above the plane of the lower surface of the box or receptacle and are spaced apart from each other.

In practical use, the fishing boat or scow, moving down stream, is connected to the dredge by a drag line 10, from the mast of the boat to the rear of the dredge, said line connected to the top of an arm 11, pivoted at its lower end to the dredge at 12; and by a second drag line 13, from the boom 14 of the boat to the front of the dredge, said line connected to the top of an arm 16, pivoted at its lower end to the shaft 7.

In this way, should the obstruction in the path of the dredge be of such character as to prevent passage of the wheels or disks 8 thereover, the line 10 to the rear of the dredge may be pulled by the engine of the boat or by manual power, to thereby turn the dredge completely over upon its top, from the obstruction as a center, so that the dredge will be carried over the obstruction, after which the dredge would be hauled in and dropped down again.

The receptacle is formed preferably of longitudinal metal bars or rods 15, engaging transverse rods 17, said rods carrying washers 17', located between said bars, whereby the bars are spaced apart from each other, the lower longitudinal bars at the sides of the receptacle being extended fowardly and curved outwardly at $17^2$, to direct mussels located slightly outside the path of the dredge, within the receptacle. The center bars 18 of the lateral bars of the receptacle are also extended forwardly at 19, to form a support for the shaft 7, brace bars 20 being extended downwardly to said shaft from the upper forward transverse rod 17. Center longitudinal rods 21 may also be extended forwardly to the center of the shaft 7, as an additional support therefor. The result is a strong, durable receptacle, that will have the weight required and will not easily become broken or get out of order.

I claim:

In a dredge, an open-front receptacle designed to be dragged over the bed of a body of water, rotary wheels located forwardly of the receptacle and adapted to engage obstructions and raise the dredge thereover, said wheels loose upon their shaft, capable of independent rotation and having peripheral notches.

In testimony whereof I affix my signature in presence of two witnesses.

GEORGE H. DELVIN.

Witnesses:
FRED HELD,
WILLIAM CRAWFORD.

Copies of this patent may be obtained for five cents each, by addressing the "Commissioner of Patents, Washington, D. C."